Figure 1:
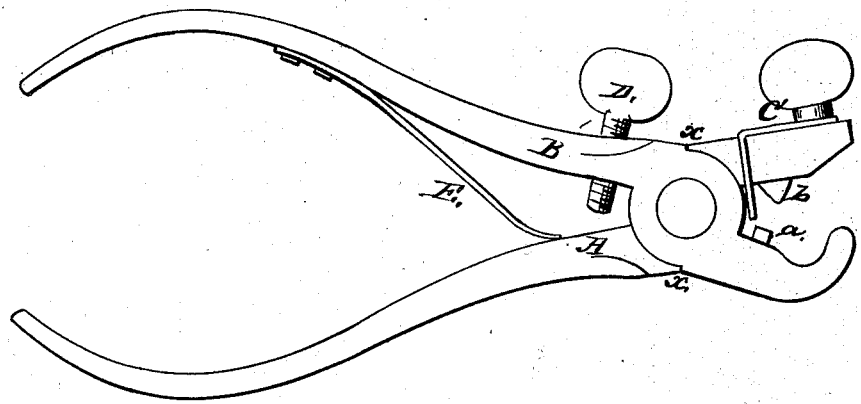
Figure 2:
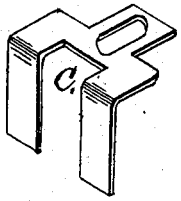

W. Nash,
Saw-Set,

N° 61,855.    Patented Feb. 5, 1867

Witnesses,
Charles Vann
John P Jacobs

Inventor,
Wm Nash
per
Alex en lei & Mason

United States Patent Office.

WILLIAM NASH, OF NEW BRITAIN, CONNECTICUT.

Letters Patent No. 61,855, dated February 5, 1867.

IMPROVED SAW-SET.

*The Schedule referred to in these Letters Patent and making part of the same.*

TO ALL WHOM IT MAY CONCERN:

Be it known that I, WILLIAM NASH, of New Britain, in the county of Hartford, and State of Connecticut, have invented certain new and useful improvements in "Saw-Sets;" and I do hereby declare that the following is a full, clear, and exact description of the same, reference being had to the accompanying drawings, and to the letters of reference marked thereon.

In the annexed drawings, making part of this specification, A and B represent the two principal parts of the saw-set, and which are made of metal. Near the forward ends of these parts the metal is cut away in an annular form, one-half the thickness of each part, so that when the two are brought together a close annular joint is formed, through which a rivet is inserted in a proper opening, to confine the two parts together, thus leaving the instrument, when its parts are joined, the thickness of one. Shoulders are formed, as seen at $x\ x$, upon the edges of each part; and the shoulders upon one part fit snugly against the corresponding shoulders upon the other part, and thus prevent them opening upon their rivet further than a required distance. The two pieces A and B are formed into lever handles back of the rivet. Forward of the rivet, and upon each of the parts, is a die-bed, and in each bed is inserted a V-shaped die, one of said dies being placed a little in advance of the other, and each being placed with reference to its shape, as shown in the drawings. These dies are marked $a$ and $b$. The forward end of the part B is curved, and the forward end of the part A is bevelled, as shown at $e$ and $f$. $c$ represents a gauge, which consists of a piece of metal bent at right angles at its centre, one wing of which is slotted so as to embrace the forward end of piece A, its ends extending up above the top of die $b$. The other wing is slotted so that a set-screw can pass throught it, for the purpose of confining it securely to piece A. By means of the slot through which the set-screw passes, the ends of the slotted wing which embraces part A are brought closer to or carried further from die $b$. D represents a screw, which passes through part B, to prevent the part A from closing more than is desired; and E represents a spring, secured at one end to part B, with its other pressing against part A, for the purpose of pressing the handles open.

In using this instrument, the screw D is first set, so as to allow the dies to pass each other just the required distance, when the handles are pressed together; then adjust the gauge $c$ to suit the size and length of the saw teeth, and to insure the dies acting upon each tooth exactly at the same place; now insert the saw blade between the curved end of piece B and bevelled end of piece A; place the tooth to be set between the dies, with the point of the tooth next to it, upon each side, pressed against the gauge; press the handles together, and the curved end of part B will bear the saw blade down toward the bevel on part A, while the die upon part A bends the tooth over the die beneath it, and thus gives set to said tooth. When the hand is removed the spring presses the handles open, and the instrument is moved to the next tooth to be set, which is operated upon in like manner.

I am aware of a patent on a saw-set issued to Oliver Newton in July, 1863, and do not claim any of the parts therein patented by him.

Having thus fully described my invention, what I claim as new, and desire to secure by Letters Patent, is—

The circular-jointed parts A and B, with their guides, dies, set-screws, and spring, when constructed, arranged, and used for forming a saw-set in the manner as specified.

WILLIAM NASH.

Witnesses:
AUSTIN HART,
LESTER R. BAILEY.